United States Patent
Ligeois et al.

(10) Patent No.: US 6,569,565 B2
(45) Date of Patent: May 27, 2003

(54) METHOD OF CONNECTING PLATES OF AN ELECTRODE TO A TERMINAL OF A STORAGE CELL, AND THE RESULTING CELL

(75) Inventors: Dominique Ligeois, St Loubes (FR); Alexandre Chaillet, Bordeaux (FR); Philippe Borel, Bordeaux (FR)

(73) Assignee: Alcatel, Paris (FR)

( * ) Notice: Subject to any disclaimer, the term of this patent is extended or adjusted under 35 U.S.C. 154(b) by 63 days.

(21) Appl. No.: 09/805,136

(22) Filed: Mar. 14, 2001

(65) Prior Publication Data

US 2001/0023038 A1 Sep. 20, 2001

(30) Foreign Application Priority Data

Mar. 16, 2000 (FR) .............................................. 00 03369

(51) Int. Cl.⁷ .............................. H01M 2/24; H01M 2/26
(52) U.S. Cl. ........................ 429/178; 429/170; 429/181; 29/623.1
(58) Field of Search ................................ 429/161, 178, 429/163, 170, 181; 29/623.1

(56) References Cited

U.S. PATENT DOCUMENTS

| 4,322,484 A | 3/1982 | Sugalski | |
|---|---|---|---|
| 5,227,267 A | * 7/1993 | Goebel et al. | 429/161 |
| 5,707,758 A | 1/1998 | Iwatsu et al. | |
| 5,849,431 A | * 12/1998 | Kita et al. | 429/164 |
| 6,245,457 B1 | * 6/2001 | Romero | 429/121 |

FOREIGN PATENT DOCUMENTS

| EP | 0 771 040 A2 | 5/1997 |
|---|---|---|
| JP | 01 255 164 A | 10/1989 |
| JP | 04 162 351 A | 6/1992 |
| JP | 08 293 299 A | 11/1996 |

\* cited by examiner

Primary Examiner—Carol Chaney
(74) Attorney, Agent, or Firm—Sughrue Mion, PLLC

(57) ABSTRACT

A method is disclosed in which the plates 2 of an electrode 1 are connected to a terminal 3 of a storage cell by clamping the plates 2 between the terminal 3 and a holding member such as a ring 6 or a washer 12 and then welding the plates 2 to the terminal 3 by transparent laser welding through the holding member. The plates 2 are preferably bent over a face of the terminal 3 before they are clamped. A tool 14 presses on an area 15 of the washer 12 to clamp the plates 2. The washer 12 and the plates 2 are then transparent laser welded to the terminal 3 along a weld line 16 around the area 15 on which the washer 12 bears. A storage cell that can be obtained by the above method is also disclosed.

9 Claims, 6 Drawing Sheets

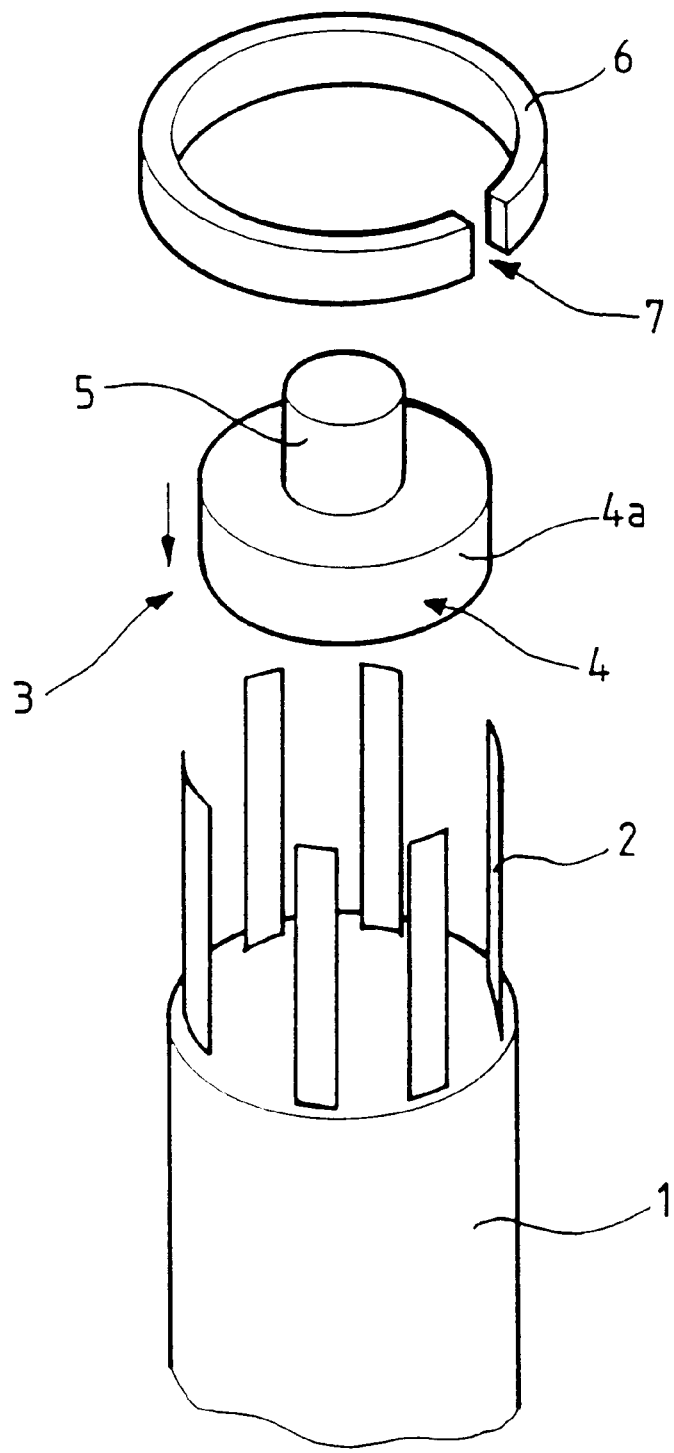
FIG_1

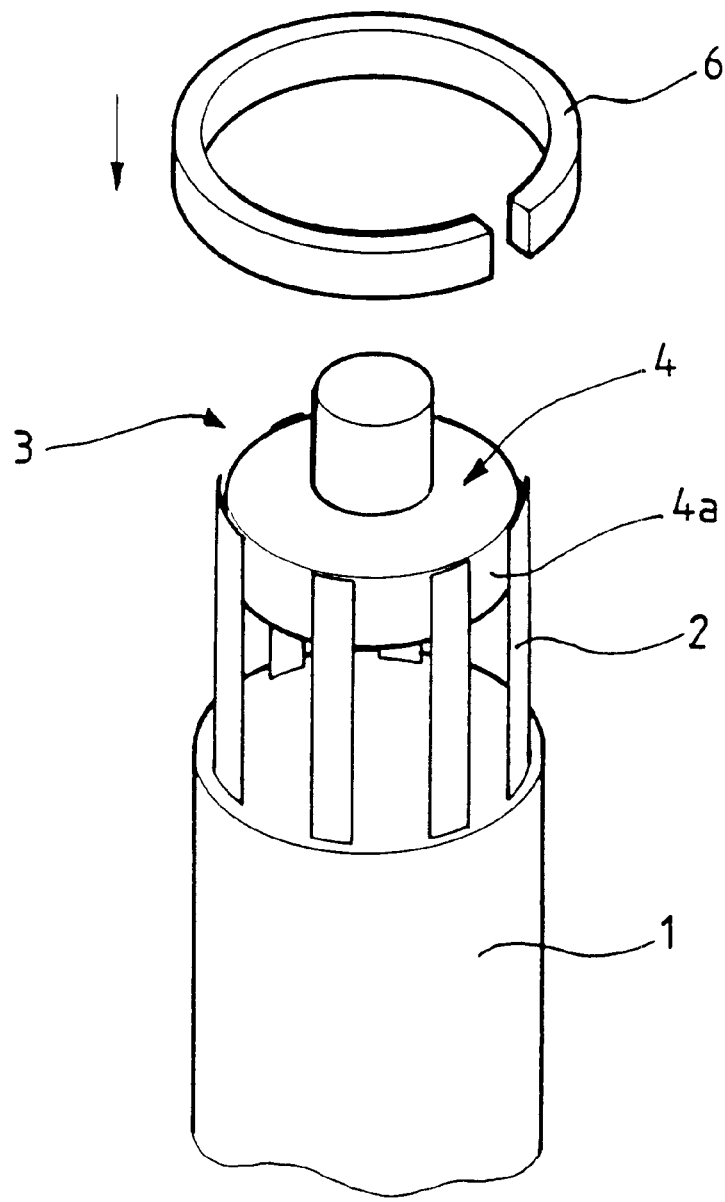
FIG_2

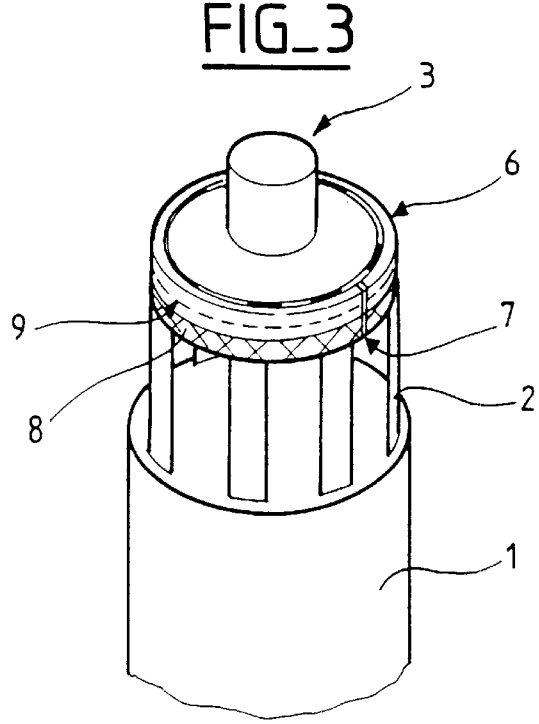
FIG_3
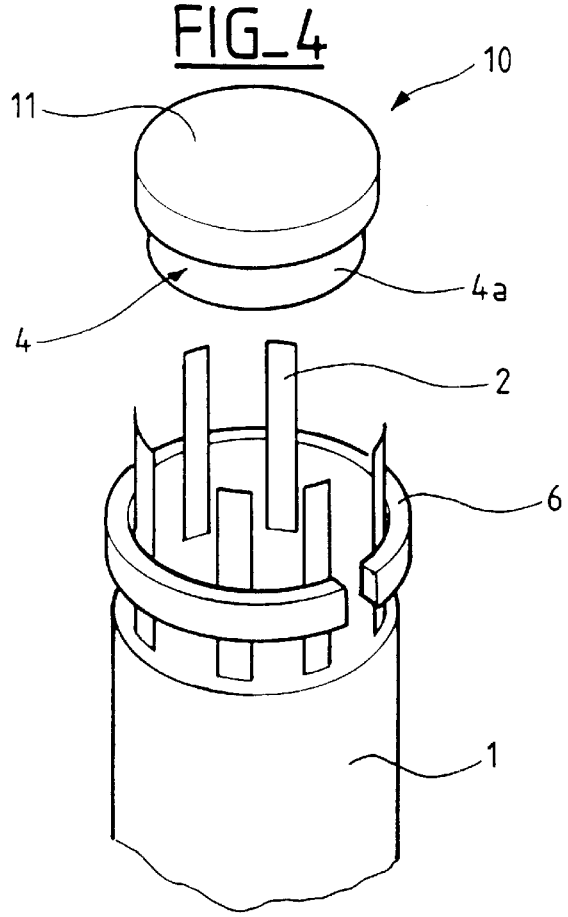
FIG_4

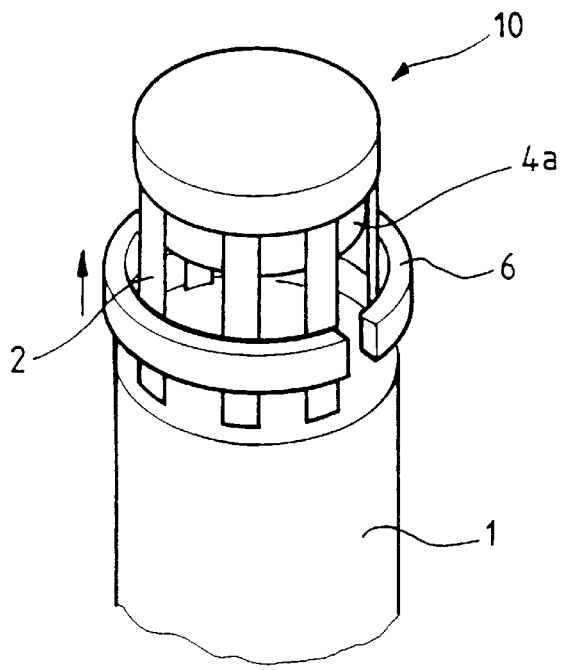
FIG_5
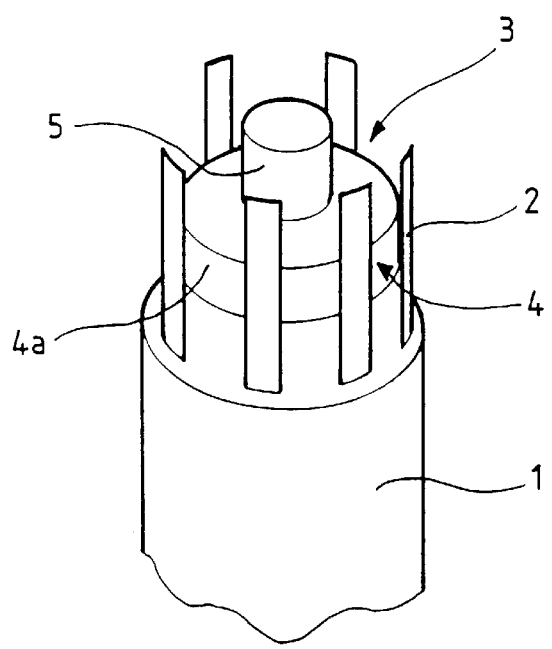
FIG_6

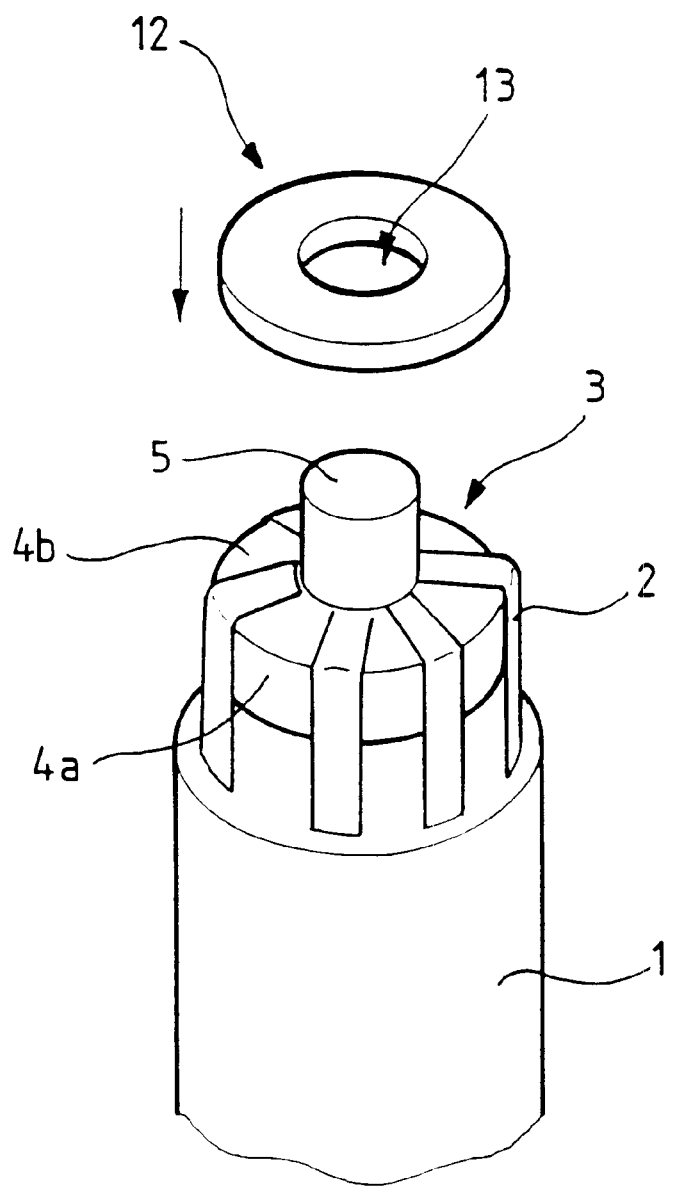
FIG_7

FIG_8
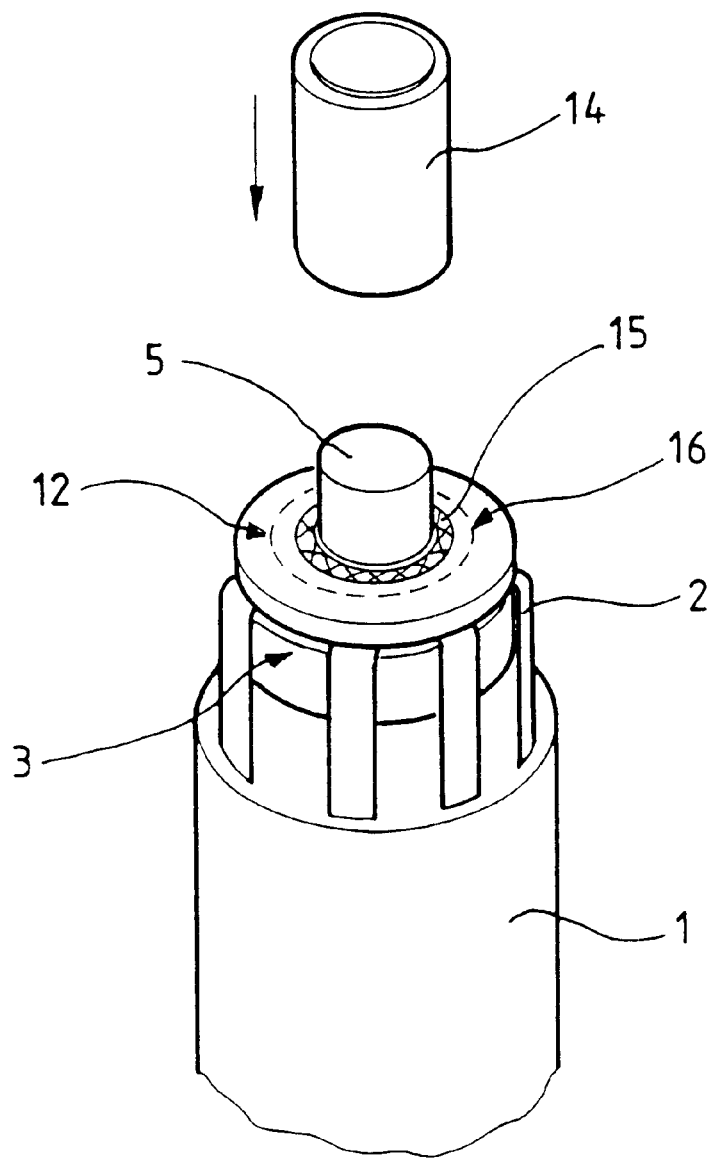

# METHOD OF CONNECTING PLATES OF AN ELECTRODE TO A TERMINAL OF A STORAGE CELL, AND THE RESULTING CELL

BACKGROUND OF THE INVENTION

1. Field of the Invention

The present invention relates to a method of connecting plates of an electrode to a terminal of a storage cell, in particular a rechargeable lithium storage cell with spiral-wound cylindrical electrodes. The invention also relates to a storage cell obtained by the method.

2. Description of the Prior Art

A storage cell with spiral-wound electrodes incorporates electrodes in the form of tapes wound around a central former or spool to form a cylinder. Each electrode includes a metal current collector, at least one face of which supports the active material of the electrode. Each electrode is electrically connected to a current output terminal which provides electrical continuity between the electrode and the load with which the cell is associated.

The terminal passes through the container of the cell: the part outside the container receives the external connections and the part inside the container is connected to the electrodes. The terminal can be fastened or attached to the container. There are various ways to make the electrical connection between an electrode and a current output terminal. One way uses one or more conductive thin metal strips also known as plates: one end of each plate is welded to the edge of the collector and the other end is welded to the internal part of the terminal inside the container.

FR-A-2752089 describes a method of connecting the plates of an electrode of a storage cell of the above kind to a terminal attached to its container. The portion of the terminal inside the container includes a cylindrical shoulder. The method consists of assembling the plates around the periphery of the shoulder by means of a cylindrical member that is moved concentrically toward the periphery of the shoulder. The plates are then fixed to the periphery of the shoulder, in particular using a ring or electrical or ultrasound welding.

The above method has the drawback of a long fabrication time. Also, electrical or ultrasound welding does not provide sufficient quality in the case of welding aluminum plates to aluminum terminals, for example. Electrical welding is difficult to carry out, especially when a plurality of plates overlap, because there is then a cumulative contact resistance between the various plates and the terminal such that electrical welding becomes impossible or at least the weld obtained is of mediocre quality and does not provide a reliable mechanical and electrical connection between the plates and the terminal. The drawback of ultrasound welding is that it cannot be used to weld the plates to the terminal in succession because the vibration generated when welding a given plate degrades or destroys the weld attaching the previous plate.

An object of the present invention is to eliminate the above drawbacks of the prior art.

SUMMARY OF THE INVENTION

To this end, the present invention proposes a method of connecting plates of an electrode to a terminal of a storage cell, the method including:

clamping the plates between a holding member and the terminal, and transparent laser welding the plates to the terminal through the holding member.

The plates are preferably each from 50 $\mu$m to 80 $\mu$m thick. The holding member is preferably from 0.5 mm to 1 mm thick.

In one embodiment the terminal, the plates and the holding member are made of aluminum. Alternatively, the terminal and the plates are each made from a material chosen from copper, nickel-plated copper and nickel and the holding member is made from nickel or nickel-plated copper.

In another embodiment the terminal has a cylindrical part and the holding member is a cylindrical ring with the same section, and:

the plates are clamped between the ring and the cylindrical part of the terminal, and the plates are welded to the cylindrical part of the terminal.

In a further embodiment the terminal has a plane part and the holding member is plane, and:

the plates are clamped between the holding member and the plane part of the terminal, and the plates are welded to the plane part of the terminal.

In this case, the method includes the step of bending the plates over the plane part from a peripheral edge of the plane part prior to clamping and welding. It is then advantageous if the terminal has a cylindrical part with the plane part on one face thereof and the holding member is a washer.

In another aspect the invention proposes a storage cell in which plates of an electrode are disposed between a terminal and a holding member and including at least one weld passing through the holding member and the plates and penetrating the terminal. The plates are preferably each from 50 $\mu$m to 80 $\mu$m thick. The holding member is preferably from 0.5 mm to 1 mm thick.

In one embodiment the terminal, the plates and the holding member are made of aluminum. Alternatively, the terminal and the plates are each made from a material chosen from copper, nickel-plated copper and nickel and the holding member is made from nickel or nickel-plated copper.

In another embodiment the terminal has a cylindrical part and the holding member is a cylindrical ring with the same section, and:

the plates are clamped between the ring and the cylindrical part of the terminal, and the plates are welded to the cylindrical part of the terminal.

In a further embodiment the terminal has a plane part and the holding member is plane, and:

the plates are clamped between the holding member and the plane part of the terminal, and the plates are welded to the plane part of the terminal.

In this case the plates are preferably bent over the plane part from a peripheral edge of the plane part prior to clamping and welding. It is then advantageous if the terminal has a cylindrical part with the plane part on one face thereof and the holding member is a washer.

Other features and advantages of the invention will become apparent on reading the following description of a preferred embodiment of the invention, which description is given by way of example only and with reference to the accompanying drawings.

BRIEF DESCRIPTION OF THE DRAWINGS

FIG. 1 is a diagram showing the plates of an electrode before they are connected to a current output terminal by a method constituting a first embodiment of the invention.

FIG. 2 is a diagram showing one step of the first embodiment of the method.

FIG. 3 is a diagram showing another step of the first embodiment of the method.

FIG. 4 is a diagram showing one step of a second embodiment of a method of connecting plates of an electrode to a current output terminal.

FIG. 5 is a diagram showing another step of the second embodiment of the method.

FIG. 6 is a diagram showing one step of a third embodiment of a method of connecting plates of an electrode to a current output terminal.

FIG. 7 is a diagram showing another step of the third embodiment of the method.

FIG. 8 is a diagram showing a further step of the third embodiment of the method.

DETAILED DESCRIPTION OF THE PREFERRED EMBODIMENTS

The invention proposes to connect the plates of an electrode to a terminal of a storage cell by clamping the plates between a holding member and the terminal to press the plates against the terminal and hold them in position while welding the plates to the terminal by transparent laser welding through the holding member. Transparent laser welding directs a laser beam onto a point on the outside surface of the holding member to melt the thickness of the holding member material progressively at that point. When the whole of the thickness of the material of the holding member has been melted, the beam impinges on the underlying plate or plates and melts the thickness of the material of the plates, and then, finally, at least the surface of the underlying material of the terminal. Cooling therefore produces a weld fastening together the holding member, the plate and the terminal. The laser beam is advantageously moved progressively, and preferably continuously, along a weld line on the outside surface of the holding member to weld all of the plates to the terminal along the weld line, the rate of advance being chosen to obtain an effective weld between the holding member, the plates and the terminal all along the weld line.

The embodiment of the invention described hereinafter relates to a cylindrical rechargeable storage cell, in particular a lithium cell. The cell typically includes an electrode assembly incorporating a positive electrode, a negative electrode, and two separators. The two electrodes are wound or spiral-wound together with the separators interleaved between them to form a cylinder. Each electrode is connected to a corresponding current output terminal by metal plates.

A first embodiment of the invention is described next with reference to FIGS. 1, 2 and 3.

FIG. 1 shows a spiral-wound electrode 1 connected to a plurality of metal plates 2 before they are connected to a current output terminal 3. The plates 2 connect the electrode 1 electrically to the terminal 3. The plates 2 are generally all the same thickness. The number of plates 2 shown is not significant and in practice depends on the power of the storage cell. The terminal 3 includes a connecting stud 5 that is usually outside the container of the cell, not shown, and a connecting part 4 that is usually inside the container. The connecting stud 5 receives the connection from the external load with which the cell is associated, for example by means of a screwthread, not shown. The connecting part 4 is a circular cylinder with the connecting stud 5 formed on one of its faces. The connecting stud 5 does not extend radially beyond the circumference 4a of the connecting part 4. The plates 2 are connected to the terminal 3 with the aid of a holding member in the form of a split cylindrical ring 6, in the manner described next.

The connecting part 4 is initially disposed between the plates 2 so that the plates 2 extend around the circumference 4a of the connecting part 4, as shown in FIG. 2. The connecting stud 5 is obviously at the end opposite the electrode 1. The terminal 3 can be held by a tool gripping the connecting stud 5, for example.

Next, the ring 6 is placed around the circumference 4a of the connecting part 4 and the plates 2. The plates 2 are therefore disposed between the circumference 4a of the connecting part 4 and the ring 6. To this end the inside diameter of the ring 6, when it is not stressed, is greater than the diameter of the connecting part 4 and sufficient to be able to surround the circumference 4a of the connecting part 4 with the plates 2 disposed around it. The ring 6 is then clamped onto the circumference 4a of the connecting part 4, for example using a concentric clamping tool, not shown. The plates 2 are therefore clamped between the circumference 4a of the connecting part 4 and the ring 6, as shown in FIG. 3. The skilled person knows how to choose the material and the dimensions of the ring 6 to achieve sufficient elasticity to enable such clamping. Likewise, the skilled person knows how to choose the width of the slit 7 in the ring 6 to allow sufficient reduction in the diameter of the ring 6 when it is clamped. Clamping is effected over only a portion 8 of the width of the outside circumference of the ring 6, shown shaded in FIG. 3.

Alternatively, the ring 6 can have an inside diameter which is less than the diameter of the connecting part 4 when it is not stressed. The ring 6 is then fitted by increasing its diameter using a spreader tool adapted to enable the ring 6 to be fitted around the circumference 4a of the connecting part 4 and the plates 2. The spreading force is then removed from the ring 6 so that it grips the circumference of the connecting part 4 to clamp the plates between them. The skilled person knows how to choose the material and the dimensions of the ring 6 when it is not stressed to obtain sufficient elasticity to enable the diameter to be increased and to obtain a sufficient force clamping the plates between the connecting part 4 and the ring 6. The shape of the ring 6 can be adapted to facilitate gripping it with the spreader tool, for example in the manner of a conventional elastic washer for mounting on a shaft.

After the ring 6 is fitted around and clamped to the connecting part 4, the plates 2 are welded to the circumference 4a of the connecting part 4 by transparent laser welding through the ring 6 and along a weld line 9 running around the outside circumference of the ring 6 and shown in dashed line in FIG. 3. During welding, the ring 6 continues to be clamped onto the circumference 4a of the connecting part 4 by the concentric clamping tool, at least if the ring 6 is not clamped to the connecting part 4 of its own accord by virtue of its elasticity, as previously described for one embodiment. Accordingly, the weld line 9 is on the outside circumference of the ring 6 and outside the area 8 in which the clamping is effected. Clamping the ring 6 to the connecting part 4 presses and hold the plates 2 against the connecting part 4 to enable reliable welding of the plates 2 to the connecting part 4 by transparent laser welding, whereby the laser beam impinges on a point on the weld line 9 on the outside circumference of the ring 6 and progressively melts, first the thickness of the material of the ring 6, then the material of the plates 2, and finally at least the surface of the material of the connecting part 4, to weld those components together. The laser beam is moved progressively along the weld line 9 to execute the weld all along it. When the weld is finished and has cooled sufficiently, the concentric clamping tool can be removed because the weld then holds the ring 6 and the plates 2 in place on the connecting part 4.

The skilled person knows how to choose the materials of the plates 2, the terminal 3 and the ring 6 and the thickness of the material of the plates 2 and the ring 6 in the area of the weld line 9 to enable transparent laser welding. The skilled person also knows how to choose the power of the laser, which can be a continuous or pulsed laser, and its rate of advance. The width of the ring 6 is preferably at least equal to the thickness of the connecting part 4 so that the ring 6 can grip the whole of the width of its circumference 4a.

The weld can be limited to only those portions of the weld line 9 that correspond to the plates 2, so avoiding, where applicable, welding the ring 6 to the connecting part 4 at locations where there is no interposed plate 2. However, it is in fact simpler to execute the weld along the whole of the weld line 9 around the outside circumference of the ring 6, which additionally has the advantage of fastening the ring 6 to the connecting part 4 more firmly and more reliably.

The plates 2 can overlap on the circumference of the connecting part 4 provided that the clamping effect of the ring 6 presses all of the plates against the connecting part 4 to enable transparent laser welding. In this case, during transparent laser welding, the laser beam impinges on the superposed plates 2 progressively until it reaches the terminal 3. The skilled person knows how to choose a sufficiently malleable metal material for the rings 6 to press all of the plates 2 effectively onto the terminal 3 if the number of plates 2 that overlap varies around the circumference 4a of the connecting part 4, in other words if the resulting thickness of the plates 2 is not constant around the connecting part 4.

The plates 2 preferably stop level with the edge of the circumference of the connecting part 4 at the same end as the connecting stud 5, as shown in FIGS. 2 and 3, if necessary by cutting them before, during or after the connecting operations previously described.

FIGS. 4 and 5 show a second embodiment of the invention that constitutes a variant of the first embodiment.

All of the components comprising the electrode 1, the plates 2 and the ring 6 are identical to those of the first embodiment and are identified by the same reference numbers. Only the current output terminal 10 is different. The terminal 10 has a connecting part 4 that is usually inside the container of the cell. The connecting part 4 is identical to that of the terminal 3 of the first embodiment and has the same function of connecting the plates 2 from the electrode 1. The terminal 10 includes a connecting cover 11 that is usually outside the container of the cell, not shown, and which makes the electrical connection between the cell and the external load, like the connecting stud 5 in the first embodiment. The cover 11 has a circular section and is attached to the connecting part 4, with which it is coaxial. The cover 11 has a diameter greater than that of the connecting part 4 and therefore extends farther in the radial direction than the circumference of the connecting part 4.

In the same way as in the first embodiment, the plates 2 are assembled between the ring 6 and the circumference 4a of the connecting part 4 with the ring 6 gripping the circumference 4a of the connecting part 4 to enable transparent laser welding along a weld line around the outside circumference of the ring 6. However, if the diameter of the cover 11 is too large for it to be passed through the ring 6 in order to fit the ring 6 around the connecting part 4, the first embodiment of the method described is modified in the following manner. First, the ring 6 is placed around the plates 2 as shown in FIG. 4. The terminal 10 is then placed over the ends of the plates 2 so that the cover 11 is at the end opposite the electrode 1 and the plates 2 are disposed around the circumference 4a of the connecting part 4 as shown in FIG. 5. The ring 6 is then moved to take up a position around the circumference 4a of the connecting part 4. Once it has been placed around the circumference 4a of the connecting part 4, the ring 6 is clamped to the circumference 4a of the connecting part 4 with the plates 2 between them, after which transparent laser welding is carried out in the same manner as for the first embodiment.

The plates 2 preferably stop level with the edge of the circumference 4a of the connecting part 4 at the same end as the cover 11, as shown in FIG. 5, by cutting them if necessary, preferably before carrying out the connecting operations previously described. The plates 2 can equally well stop level with the edge of the outside circumference of the ring 6 at the same end as the cover 11 by cutting them after fitting and clamping the ring 6 around the connecting part 4. Alternatively, the plates 2 can equally well be cut off level with the edge of the circumference of the cover 11 at the same end as the ring 6 by cuffing them after fitting and clamping the ring 6 around the connecting part 4.

FIGS. 6, 7 and 8 show a third embodiment of the invention that constitutes a variant of the first embodiment.

All of the components comprising the electrode 1, the plates 2 and the terminal 3 are identical to those of the first embodiment and are identified by the same reference numbers. However, the ring 6 is replaced by a holding member in the form of a washer 12. The plates 2 are connected to the terminal 3 in the following manner.

Firstly, the terminal 3 is positioned between the plates 2 of the electrode 1 with the connecting stud 5 at the end opposite the electrode 1. The terminal 3 is positioned so that the plates project beyond the circumference 4a of the connecting part 4 and lie alongside the connecting stud 5, as shown in FIG. 6.

Next, the portion of the plates 2 that projects beyond the connecting part 4 is bent over the face 4b of the connecting part 4 at the same end as the connecting stud 5, as shown in FIG. 7. The plates 2 preferably extend only over the face 4b, and not up the connecting stud 5, if necessary by cutting them at any time before, during or after the connecting operations currently being described. The plates 2 can be bent over the face 4b using a tool with three to six branches and moving concentrically over the outside of the terminal 3 towards the axis thereof, for example.

Next, the washer 12 is placed on the face 4b of the connecting part 4 so that the plates 2 are disposed between the face 4b and the washer 12, as shown in FIGS. 7 and 8. To this end the washer 12 has an opening 13 corresponding to the cross section of the connecting stud 5. In the example shown the connecting stud has a circular cross section coaxial with the connecting part 4. In order to correspond to the terminal 3, the washer 12 is advantageously circular with an outside diameter corresponding to that of the connecting part 4 and the opening 13 is also circular and coaxial with the outside circumference of the connecting stud 5.

The washer 12 is then pressed against the face 4b of the connecting part 4, for example using a hollow cylindrical tool 14 bearing on the washer 12 around the connecting stud 5. The area 15 on which the tool 14 bears on the face 4b is shaded. During this operation, the face opposite the face 4b of the connecting part 4 can bear against the former of the electrode 1, for example, or be braced by an appropriate tool, such as a threaded rod screwed into a connecting thread, not shown, in the connecting stud 5. The plates 2 are therefore clamped between the face 4b of the connecting part 4 and the washer 12.

After fitting and clamping the washer 12 to the face 4b of the connecting part 4, the plates 2 are welded to the face 4b of the connecting part 4 in a similar manner to that of the first embodiment, except that it is effected through the face of the washer 12, i.e. by transparent laser welding through the washer 12 and along a weld line 16 around the connecting stud 5, which is shown in dashed line in FIG. 8. During welding, the washer 12 continues to be clamped against the face 4b of the connecting part 4 by means of the tool 14. The weld line 16 is therefore on the face of the washer 12 outside the area 15 on which the tool 14 bears. The transparent laser welding beam impinges on a point on the weld line 16 on the face of the washer 12 opposite the face 4b of the terminal 3 and progressively melts, first the thickness of the material of the washer 12, then the material of the plates 2, and finally at least the surface of the material of the face 4b of the connecting part 4, to weld those components together. The laser beam is moved progressively along the weld line 16 to execute the weld all along it. When the weld is finished and has cooled sufficiently, the tool 14 can be removed because the weld holds the washer 12 and the plates 2 in place on the face 4b of the connecting part 4.

The weld could be restricted to only those portions of the weld line 16 that correspond to the plates 2, where applicable avoiding welding of the washer 12 to the connecting part 4 where there is no interposed plate 2. However, it is in fact simpler to execute the weld all along the weld line 16 around the connecting stud 5, which has the further advantage of fastening the washer 12 to the connecting part 4 more firmly and more reliably.

The skilled person knows how to choose the material of the plates 2, the terminal 3 and the washer 12 and an appropriate thickness of the material of the plates 2 and the washer 12 in the area of the weld line 16 to enable transparent laser welding. The skilled person also knows how to choose the power of the laser, which can be a continuous or pulsed laser. The diameter of the washer 12 is preferably at least equal to the diameter of the connecting part 4 so that the washer 12 can grip the whole of the face 4b of the connecting part 4.

In the third embodiment, the plates 2 can also overlap on the face 4b of the connecting part 4 provided that the clamping force applied to the washer 12 presses all the plates 2 against the face 4b of the connecting part 4 to enable transparent laser welding. In this case, the plates 2 are welded together where they overlap. The skilled person knows how to choose a sufficiently malleable metal material for the washer 12 if the number of overlapping washers 2 varies along the face 4b of the connecting part 4, in other words if the resulting thickness of the plates 2 around the connecting part 4 is not constant.

One example of the dimensions and materials that can be used for the three embodiments previously described is provided hereinafter.

The plates 2, the terminal 3 or 10 and the ring 6 or the washer 12 are preferably made from electrochemically compatible metals. Also, the material of the ring 6 or the washer 12 is chosen to be compatible with transparent laser welding through it, given its thickness, i.e. a material that does not reflect the welding laser beam much or at all. Accordingly, in the case of the terminal and the plates of a positive electrode, all three are advantageously made of aluminum. In the case of the terminal and the plates of a negative electrode, the plates and the terminal are preferably made of nickel, copper or nickel-plated copper and the ring 6 or the washer 12 is preferably made of nickel or nickel-plated copper, for improved transparency to laser welding, i.e. less reflection of the laser beam compared to copper.

The thickness of the plates 2 is preferably from 50 $\mu$m (50 micrometers) to 80 $\mu$m (80 micrometers), which enables particularly good transparent laser welding. The thickness of the ring 6 or the washer 12 in the area of the weld line 9 or 16 is preferably from 0.5 mm to 1 mm. The width of the plates 2 is generally from 2 mm to 10 mm.

For the first two embodiments, the diameter of the connecting part 4 is from 25 mm to 50 mm, for example, and its thickness is advantageously at least 4 mm. For the third embodiment, the diameter of the connecting part 4 is from 30 mm to 50 mm, for example, and the diameter of the connecting stud 5 is from 8 mm to 15 mm, for example.

The average clamping pressure of the ring 6 or the washer 12 against the connecting part 4—with the plates 2 clamped between them—during transparent laser welding is preferably from 30 N/cm$^2$ to 60 N/cm$^2$. This is based on the assumption that the force applied by the ring 6 or the washer 12 to the connecting part 4 is uniformly distributed. Accordingly, for the third embodiment, the clamping force applied to the washer 12 by the tool 14 is preferably from 150 N to 200 N for a washer 12 having an outside diameter of 30 mm corresponding to that of the connecting part 4 and with an opening 13 whose diameter is 15 mm.

The welding can be performed using a continuous YAG laser with a power rating of approximately 2000 W, for example, for a thickness of the ring 6 or the washer 12 of 0.5 mm and with five plates 2 stacked one on the other at the level of the connecting part 4, with a rate of advance of the laser beam of the order of 10 m/min.

Transparent laser welding produces an electrical connection of high quality and a firm and reliable mechanical connection of the plates 2 to the terminal 3 which is additionally reinforced by the welding of the ring 6 or the washer 12 to the combination of the plates/terminal. The third embodiment has the further advantage of simplifying the fitting and clamping of the plates 2 to the connecting part 4 of the terminal 3 through the use of simpler tools, and enables faster, and therefore more economical, execution of those operations. What is more, the member pressing the plates 2 against the connecting part 4 is a simple washer of very low cost.

Of course, the present invention is not limited to the examples and embodiments described and shown, and lends itself to many variants that will suggest themselves to the skilled person. In particular, the invention can be applied to a storage cell that is not rechargeable. It is also clear that the holding member no longer performs the function of holding the plates against the terminal after it has been welded to the terminal with the plate; it is then the resulting weld that holds the plates to the terminal. It has nevertheless been referred to in the same terms—i.e. as a holding member—after the welding is done, both in the description and in the claims.

There is claimed:

1. A method of connecting plates of an electrode to a terminal of a storage cell, said method including:

clamping said plates between a holding member and said terminal, and transparent laser welding said plates to said terminal through said holding member.

2. The method claimed in claim 1 wherein said plates are each from 50 µm to 80 µm thick.

3. The method claimed in claim 1 wherein said holding member is from 0.5 mm to 1 mm thick.

4. The method claimed in claim 1 wherein said terminal, said plates and said holding member are made of aluminum.

5. The method claimed in claim 1 wherein said terminal and said plates are each made from a material chosen from copper, nickel-plated copper and nickel and said holding member is made from nickel or nickel-plated copper.

6. The method claimed in claim 1 wherein said terminal has a cylindrical part and said holding member is a cylindrical ring, and wherein:

said plates are clamped between said ring and said cylindrical part of said terminal, and said plates are welded to said cylindrical part of said terminal.

7. The method claimed in claim 1 wherein said terminal has a plane part and said holding member is plane, in which method:

said plates are clamped between said holding member and said plane part of said terminal, and said plates are welded to said plane part of said terminal.

8. The method claimed in claim 7 including the step of bending said plates over said plane part from a peripheral edge of said plane part prior to clamping and welding.

9. The method claimed in claim 7 wherein said terminal has a cylindrical part with said plane part on one face thereof and said holding member is a washer.

* * * * *